United States Patent
McSwiggin et al.

[15] 3,660,106
[45] May 2, 1972

[54] METHOD OF MAKING FLAKED ROAST AND GROUND COFFEE

[72] Inventors: Joseph R. McSwiggin; Charles H. Brandt, both of Cincinnati, Ohio

[73] Assignee: The Procter & Gamble Company, Cincinnati, Ohio

[22] Filed: May 12, 1969

[21] Appl. No.: 823,942

[52] U.S. Cl. .................................................99/65, 99/69
[51] Int. Cl. ..............................................A23f 1/00
[58] Field of Search ..........................................99/65, 68, 69

[56] References Cited

UNITED STATES PATENTS

| | | | |
|---|---|---|---|
| 1,903,362 | 4/1933 | McKinnis | 99/65 |
| 2,123,207 | 7/1938 | Rosenthal | 99/65 |
| 2,281,320 | 4/1942 | Odell, Jr. | 99/68 |

*Primary Examiner*—Frank W. Lutter
*Assistant Examiner*—William L. Mentlik
*Attorney*—R. C. Witte and E. J. Sease

[57] ABSTRACT

A method of making flakes of roast and ground coffee wherein said flakes have a flake bulk density of from 0.38 grams/cc to 0.50 grams/cc, a flake thickness of from 0.008 inches to 0.025 inches and a flake moisture content of from 2.5 to 7.0 percent. The method comprises passing roast and ground coffee having a moisture content of from 2.5 to 7.0 percent through a roll mill having a roll diameter of from 6.0 inches to 30.0 inches, at a roll pressure of from 1,500 lbs./inch of nip to 5,000 lbs./inch of nip, at a roll surface temperature of from 50° F. to 200° F. and at a roll peripheral surface speed of from 100 ft./min. to 1,500 ft./min.

4 Claims, No Drawings

METHOD OF MAKING FLAKED ROAST AND GROUND COFFEE

BACKGROUND OF THE INVENTION

As used herein, the term roast and ground coffee refers to a coffee product comprising conventionally prepared roast and ground coffee particles and also decaffeinated roast and ground coffee particles. It does not include flaked roast and ground coffee particles which are hereinafter referred to as flaked coffee or roast and ground coffee flakes, the two terms being used interchangeably.

Flaked coffee is known in the art. McKinnis, U.S. Pat. No. 1,903,362, Rosenthal U.S. Pat. No. 2,123,207, and Carter U.S. Pat. No. 2,368,113 all disclose preparation of flaked coffee by roll milling roast and ground coffee. Of these three patents the most relevant is McKinnis who discloses production of "very thin" and "substantially uniform thickness" coffee flakes by roll milling roast and ground coffee particles. However, in spite of the fact that the McKinnis patent has been in existence since Apr. 4, 1933, heretofore no one has produced a consumer acceptable flaked coffee product; moreover, at the present time not one known flaked coffee product is sold on the U.S. coffee market.

The reason for the present lack of a consumer acceptable flaked coffee product is believed to be because heretofore certain essential coffee flake characteristics discussed hereinafter were unknown.

A copending, commonly assigned, application Ser. No. 30,246, filed Apr. 20, 1970, as a continuation-in-part of now abandoned application Ser. No. 823,954, filed May 12, 1969, Joffe, entitled, "Flaked Coffee and Products Produced Therefrom," relates to roast and ground coffee flakes having a flake bulk density of from 0.38 grams/cc to 0.50 grams/cc and preferably from 0.42 grams/cc to 0.48 grams/cc, and a flake thickness of from 0.008 inches to 0.025 inches, preferably from 0.10 inches to 0.016 inches, and a flake moisture content of from 2.5 to 7.0 percent, preferably from 3.0 to 6.0 percent. This above identified Joffe application, now U.S. Pat. No. 3,615,667, also relates to mixtures of the above described roast and ground coffee flakes and conventional roast and ground coffee particles to produce a product of excellent aroma, strength and flavor.

Producing roast and ground coffee flakes having the above specified physical characteristics has been found to be essential in regard to production of a consumer acceptable flaked coffee product.

Providing a flaked bulk density within the range of from 0.38 grams/cc to 0.50 grams/cc is essential because bulk densities within this range are generally the bulk densities of conventionally prepared roast and ground coffees of "regular," "drip" and "fine" ground. If the bulk density varies from this range and is, for example, higher, the consumer would need to use substantially lesser than usual quantities of coffee to produce a brew of given strength; this required adjustment in consumer habits might be made with some difficulty.

Providing roast and ground coffee flakes having a flake thickness of from 0.008 inches to 0.025 inches is essential in producing roast and ground coffee flakes having the requisite bulk density as previously discussed and in producing flakes which do not have a propensity towards changing in bulk density after packing.

Providing roast and ground coffee flakes having a flake moisture level of from 2.5 to 7.0 percent by weight is essential because flakes having lower moisture contents are too fragile and often break during processing and packaging. Such breaking changes the product bulk density which if it falls without the range of from 0.38 grams/cc to 0.50 grams/cc will produce a consumer unacceptable product. On the other hand, moisture contents above 7.0 percent are consumer unacceptable because the flakes become tacky and oily in appearance.

In summary, the Joffe application, which is incorporated herein by reference, discloses and claims a flaked coffee having a carefully controlled bulk density, flake thickness and moisture content, all of which have been found critical in producing consumer acceptable coffee flakes. Hereinafter, the coffee flakes having the above described physical characteristics which are disclosed and claimed in the copending commonly assigned Joffe application will be referred to as consumer acceptable coffee flakes.

In regard to specific processing conditions, the prior art patents are vague and merely teach passing roast and ground coffee through a roll mill. It has now been found that the coaction of particular roll milling processing variables within the hereinafter described ranges provides high yields of flaked coffee having the requisite physical characteristics for consumer acceptable flakes. While some processing conditions not within the hereinafter described ranges produces some flakes having the requisite bulk density, thickness and moisture content, operation within the specified ranges insures consistently high yields of flakes of high structural integrity which have little or no flavor degradation. Broadly, this application relates to a specific method of producing roast and ground coffee flakes having the above-enumerated essential physical characteristics.

Accordingly, it is an object of this invention to provide a method of making the roast and ground coffee flakes claimed in copending application, Joffe, entitled "Flaked Coffee and Products Produced Therefrom" by a procedure which insures consistently high yields of flakes of high structural integrity having little or no flavor degradation.

SUMMARY OF THE INVENTION

This invention relates to a method of making flakes of roast and ground coffee wherein said flakes have a flake bulk density of from 0.38 grams/cc to 0.50 grams/cc, a flake thickness of from 0.008 inches to 0.025 inches and a flake moisture content of from 2.5 to 7.0 percent, said method comprising passing roast and ground coffee having a moisture content of from 2.5 to 7.0 percent through a roll mill having a roll diameter of from 6.0 inches to 30.0 inches, at a roll pressure of from 1,500 lbs./inch of nip to 5,000 lbs./inch of nip, at a roll surface temperature of from 50° F. to 200° F. and at a roll peripheral surface speed of from 100 ft./min. to 1,500 ft./min. This process produces consumer acceptable coffee flakes at consistently high yields and further produces flakes of high structural integrity and flakes having little or no flavor degradation.

DETAILED DESCRIPTION OF THE INVENTION

In forming flaked roast and ground coffee, roast and ground coffee is subjected to a mechanical pressure by passing roast and ground coffee through two parallel smooth or highly polished rolls so that the coffee particles passing between the rolls are crushed and flattened such that the coffee cellular structure is disrupted and the resulting appearance is that of a flake. In roll milling roast and ground coffee to produce consumer acceptable flaked coffee, it has been found important to control at least five processing variables. These variables are roll pressure, roll surface temperature, roll peripheral surface speed, roast and ground coffee moisture content and roll diameters. An additional variable which is not as important, but because it helps in producing higher yields and therefore should preferably be carefully controlled, is roast and ground coffee particle size.

Roll pressure is measured in pounds per inch of nip. Nip is a term used in the art to define the length of surface contact between two rolls when the rolls are at rest. To illustrate, it can be thought of as a line extending the full length of the rolls and defining the point of contact between two rolls.

To produce high yields of the heretofore described consumer acceptable flaked coffee, it is essential that the roll pressure be within the range of from 1,500 lbs./inch of nip to 5,000 lbs./inch of nip and preferably within the range of from 2,000 lbs./inch of nip to 4,000 lbs./inch of nip. If pressures much less then 1,500 lbs./inch of nip are employed, the resulting product does not have a flaked coffee appearance.

Moreover, any flakes that are produced are much thicker than 0.025 inches and consequently the flakes are not consumer acceptable. On the other hand, if pressures in excess of 5,000 lbs./inch of nip are employed the roast and ground coffee flakes tend to be thinner than 0.008 inches and the product bulk density is less than the required minimum of 0.38 grams/cc needed for a consumer acceptable coffee flake. Additionally, at pressures in excess of 5,000 lbs./inch of nip the roll friction produces excessive amounts of heat which as hereinafter related also tends to produce thin, undesirable flakes having unacceptable bulk densities. For overall process efficiency roll pressures within the range of from 2,000 lbs./inch of nip to 4,000 lbs./inch of nip are preferred.

Roll surface temperature, as used herein, is measured in degrees Fahrenheit and refers to the average surface temperature of the rolls. Control of roll mill surface temperatures is accomplished by controlling the temperature of a heat exchange fluid passing through the inner core of the rolls. Generally, the fluid, which is most often water, is heated or cooled and passed through the inside of the rolls. The result is that the roll surface which is usually a smooth, high polished steel surface, is subjected to temperature control by means of heat transfer. Of course, in actual operation the surface temperature will not be exactly the same as the temperature of the heat exchange fluid and will be somewhat higher because milling of coffee particles to produce flakes tends to increase the roll surface temperature. Accordingly, the required heat exchange fluid temperature to maintain any specific roll surface temperature depends upon several factors such as the kind of metal the roll surfaces are made of, the speed of operation of the roll mills, and the heat exchange fluid employed.

Generally, it can be stated that higher roll surface temperatures tend to produce thinner flakes of roast and ground coffee. Additionally, at higher temperatures the propensity for flavor degradation becomes increased. On the other hand, lower roll surface temperatures produce thicker flakes with little or no flavor degradation. To produce the consumer acceptable flaked roast and ground coffee heretofore described it is essential that the roll surface temperature be within the range of from 50° F. to 200° F. Temperatures less than 50° F. are undesirable because expensive cooling systems must be employed and at such low temperatures the flake thickness tends to be greater than 0.025 inches; consequently, the flakes are consumer unacceptable. Additionally, at temperatures less than 50° F. the resultant coffee flakes are very brittle and have a tendency to break during subsequent processing and packaging. This is undesirable because breaking of brittle flakes results in a change in product bulk density which may affect the consumer acceptability of the coffee flakes produced. Such, weak flakes often have bulk densities not within the range of consumer acceptable flake bulk densities.

To produce flaked roast and ground coffee having the hereinbefore defined consumer acceptable bulk density, flake thickness and moisture content, it is preferred that the roll mill surface temperature be within the range of from 110° F. to 180° F. When roll surface temperatures within this range are employed the majority of the resultant coffee flakes are of a proper thickness to produce a consumer acceptable bulk density coupled with a product having high structural integrity and little or no flavor degradation.

The roll peripheral surface speed is measured in feet per minute of surface circumference which passes by the nip. Generally, higher peripheral surface speeds produce thinner flakes and conversely lower peripheral surface speeds produce thicker flakes. Here again, the interplay of the milling conditions can be seen. For instance, at higher peripheral surface speeds friction increases the roll surface temperature which tends to produce thinner consumer unacceptable coffee flakes. Thus, roll peripheral surface speeds which result in roll surface temperatures above 200° F. must not be employed. On the other hand, extremely low roll peripheral surface speeds tend to produce thicker and less consumer acceptable flakes. Roll peripheral speeds within the range of 100 ft./min. to 1,500 ft./min. are essential in producing flaked roast and ground coffee having the hereinbefore defined consumer acceptable flake characteristics. If roll peripheral surface speeds in excess of 1,500 ft./min. are employed, the resultant flakes are too thin for consumer acceptability. Moreover, at speeds in excess of 1,500 ft./min., the heat of friction is so great that the roll surface temperatures cannot be maintained at or less than the maximum temperature of 200° F. Consequently, a significant amount of flavor degradation of the flaked coffee occurs. On the other hand, at roll peripheral surface speeds less than 100 ft./min. the rate of production of flaked roast and ground coffee is so slow as to be commercially impractical. Especially preferred roll peripheral surface speeds which allow for easy temperature control and desirable throughput rates are from 350 ft./min. to 800 ft./min.

In further regard to the roll peripheral surface speeds, it should be mentioned that optimum yields of consumer acceptable flakes are generally obtained when the rolls operate at approximately the same speeds. Differential roll speeds, however, can be utilized. Roll speed ratios in excess of 1.5 to 1.0 are not desirable. Preferably when differential roll speeds are employed the roll speed rate is within the range of greater than 1:1 up to 1.4:1. However, in no event should the speed of the fastest roll be in excess of 1,500 ft./min.

In producing consumer acceptable flaked roast and ground coffee it is essential that the flake moisture content be from 2.5 to 7.0 percent by weight, with from 3.0 to 6.0 percent being preferred. Consequently, the moisture content of the roast and ground coffee particles to be flaked should be within the range of from 2.5 to 7.0 percent. At moisture contents less than 2.5 percent the roast and ground coffee is too dry to flake during roll milling and has a tendency to grind rather than flake. A minimum moisture content of 2.5 percent by weight is required to soften the coffee cellular construction thereby making it more susceptible to flaking during milling. On the other hand, moisture contents above 7.0 percent are to be avoided because the flakes become unsightly in appearance. Moreover, if the coffee moisture content is higher than 7.0 percent, prior to milling to produce flakes, the staling propensity of the resultant flakes is substantially increased. Providing a moisture content of the roast and ground coffee to be flaked within the range of from 3.0 to 6.0 percent provides the highest yield of consumer acceptable flaked coffee coupled with little or no flavor degradation and is therefore preferred.

In regard to the particle size of the roast and ground coffee employed in the flaking process no criticality exists. However, from the standpoint of producing consumer appealing flaked coffee appearance, it is preferred that the roast and ground coffee particles have a particle size of from 0.0 to 18.0 percent retained on a 12 mesh U.S. Standard screen, from 0.0 to 46.0 percent retained on a 16 mesh U.S. Standard Screen, from 15.0 to 50.0 percent retained on a 20 mesh U.S. Standard Screen, from 7.0 to 30.0 percent retained on a 30 mesh U.S. Standard Screen, from 4.0 to 15.0 percent retained on a 40 mesh U.S. Standard Screen and from 3.0 to 8.0 percent passing through a 40 mesh U.S. Standard Screen. Speaking in more familiar terms, the roast and ground coffee to be flaked can be "regular," "drip" or "fine" grind as these terms are used in a traditional sense. The standards of these grinds as suggested in the 1948 Simplified Practice Recommendation by the U.S. Department of Commerce (see *Coffee Brewing Workshop Manual*, page 33, published by the Coffee Brewing Center of the Pan American Bureau are as follows: "Regular grind," 33 percent is retained on a 14 mesh Tyler Standard Sieve, 55 percent is retained on a 28 mesh Tyler Standard Sieve and 12 percent passes through a 28 mesh Tyler Standard Sieve; "drip grind," 7 percent is retained on a 14 mesh Tyler Standard Screen, 73 percent on a 28 mesh Tyler Standard Sieve and 27 percent passes through a 28 mesh Tyler Standard Sieve; and "fine grind" 100 percent passes through a 14 mesh Tyler Standard Sieve, 70 percent being retained on a 28 mesh Tyler Standard Sieve and 30 percent passing through a 28 mesh Tyler Standard Sieve. Of the above mentioned traditional grind sizes the most preferred is "regular grind."

As can be seen from the foregoing description, the grind size of the roast and ground coffee to be flaked does not represent a critical aspect of the flaking method of this invention; however, while the particle size is not critical, it is desirable to regulate the particle size because this in turn regulates the sieve analysis of the resulting roast and ground coffee flakes. This can be important in producing a flaked coffee product having different "grind sizes," i.e., "regular grind," "fine grind," and "drip grind" as those terms are used in their traditional sense.

The diameter of the roll mills employed controls the angle of entry into the nip. The angle of entry into the nip in turn has a direct effect on the flake thickness, and consequently on the bulk density of the resultant roast and ground coffee flakes. To produce the hereinbefore defined consumer acceptable flaked roast and ground coffee it is essential that the roll diameter be within the range of from 6 inches to 30 inches with from 9 inches to 25 inches being preferred. If rolls having a diameter of less than 6 inches are utilized the roast and ground coffee particles tend to churn on the mill surfaces and not pass through the nip; consequently, the throughput rate of the roast and ground coffee to be flaked becomes so slow as to be impractical. Roll mills having roll diameters greater than 30 inches are not readily commercially available.

As can be seen from the foregoing description the ranges of each of the described milling process variables are closely tied to and correlated with each of the other processing variables. A change in one variable often has a direct effect in changing another variable. For instance, operation at high roll pressures, in excess of 5,000 lbs./inch of nip, increases the frictional resistance which in turn generates heat and increases the roll surface temperature. The increased inward pressure at the nip of the roll mills coupled with the resulting higher temperatures produces thin, weak flakes; and if the pressure is sufficient to increase the roll surface temperature above 200° F. the flaked coffee undergoes a flavor degradation. Likewise, roll peripheral surface speeds in excess of 1,500 ft./min. may produce some flakes of proper thickness for consumer acceptability but because of the increase of roll surface temperatures which accompanies the high speed, the flakes will be of inferior structural integrity and often will have undergone flavor degradation; moreover, the yield of flakes of proper thickness and density will be substantially decreased. Thus, the flaking procedure of this invention takes into account the interrelated and coacting nature or roll pressure, roll temperatures, coffee moisture levels, roll diameter, roll peripheral surface speed and to a lesser extent the particle size of the roast and ground coffee to be flaked. The result of operation of each of these process variables within the hereinbefore described ranges is that high yields of consumer acceptable flaked roast and ground coffee having little or no flavor loss and further characterized by having suitable structural integrity to prevent breaking when packaging, is produced.

The feed rate into the roll mill, of the roast and ground coffee to be flaked, is not critical; either choke feeding or starve feeding can be employed as long as the previously discussed processing variables are operated within their prescribed ranges. Choke feeding is defined as having excess amounts of coffee settling on the roll mills waiting to pass through the nip. It is the opposite of starve feeding.

In further regard to the feeding rate, will either starve feeding or choke feeding can be employed, starve feeding is preferred because of particular process advantages offered by starve feeding such as greater economic efficiency, increased equipment life and increased process flexibility. For a detailed description of starve feeding see copending, commonly assigned, concurrently filed herewith applications, Menzies et al., entitled "A Method of Starve Feeding Coffee Particles," Ser. No. 823,900, now abandoned, and Menzies, "An Apparatus For Starve Feeding Coffee Particles," Ser. No. 823,901, now abandoned.

In regard to the types of roast and ground coffee utilized in the flaking process of this invention see the copending and previously incorporated by reference application of Joffe entitled, "A Flaked Coffee Product."

As indicated previously, the process of this invention not only produces consumer acceptable flakes but also produces them at consistently high yields, i.e., yields on a weight basis of over 80 percent and usually in excess of 90 percent. Such high yields are highly desirable in producing a consumer product on a large scale. Yield as used herein refers to the percent on a weight basis of flakes having the requisite physical characteristics for consumer acceptability, particles not meeting these criteria are screened out and can be recycled for further processing.

Two more important advantages of this process are that the flakes produced by this process are of high structural integrity and have undergone little or no flavor degradation. Producing flakes of high structural integrity (i.e. physically strong and not easily susceptible to breakage during packing) is important because large percentages of broken flakes may change the product bulk density and is known to present a consumer unappealing appearance. The fact that little or no coffee flavor degradation occurs during operation of the process of this invention is, of course, important in respect to consumer preference for the product.

The following example is offered to further illustrate but not limit the invention disclosed herein.

EXAMPLE I

Four Hundred pounds of a blend comprising 25 percent high quality Arabicas, 43.75 percent Brazils, 6.25 percent low quality Arabicas and 25 percent Robustas is roasted in a Thermalo roaster at air temperatures within the range of from 400° F. to 550° F. The end roast temperature is 430° F. The total roast time is 16 minutes and the roast was quenched with 7 gallons of water.

Four hundred pounds of the above referred to roasted blend is ground to regular grind size in a Gump pilot grinder. The roast and ground coffee moisture level is 4.0 percent. The regular grind roast and ground coffee is used to prepare flaked roast and ground coffee in the following manner: The coffee is choke fed into a Lehman two-roll mill. The roll mill is further characterized by having rolls of a 13 inch diameter. The roll pressure is 3,000/inch of nip; the roll surface temperature is 140° F; and the roll peripheral speed of each of the rolls is 500 ft./min.

The thickness of the flakes produced is 0.011 inches, and the flake bulk density is 0.44 grams/cc. The moisture content of the resulting flaked coffee is 4.0 percent. The yield on a weight basis of flaked coffee is 92 percent.

A panel of four expert tasters prepares cups of coffee from the flaked coffee in the following manner: The amount of flaked coffee used is 7.2 grams/cup; the amount of water used per cup is 178 milliliters; the coffee is placed in a conventional percolator and allowed to perk until the temperature reaches 180° F. at which time the coffee beverage is poured into cups to be tasted by the expert panel. The panel compares the taste of coffee brewed from the hereinbefore described flakes with conventionally prepared coffee beverage prepared from regular grind Folger roast and ground coffee. The experts note that the beverage produced from the flaked coffee was about 33 percent stronger in taste than the coffee brewed from standard roast and ground coffee regular grind size. In comparing the beverages produced from flaked coffee and ground coffee, the panel notes that little or no flavor degradation of the flaked coffee had occurred.

Subsequent packaging tests reveal that the hereinbefore described flakes exhibit a very low incidence of flake breaking, indicating the flakes are of high structural integrity. The product bulk density does not change significantly after packing as a result of this low breakage incidence.

Substantially similar results are obtained when the roast and ground coffee particles utilized in the example are decaffeinated particles in that high yields of consumer acceptable flakes of high structural integrity are produced.

What is claimed is:

1. A method of making flakes of roast and ground coffee wherein said flakes have a flake bulk density of from 0.38 grams/cc to 0.50 grams/cc, a flake thickness of from 0.008 inch to 0.025 inch, and a flake moisture content of from 3.0 to 6.0 percent said method comprising passing roasted and ground coffee having a moisture content of from 3.0 to 6 percent through a roll mill having a roll diameter of from 9 inches to 25 inches, at a roll pressure of from 2,000 lbs./inch of nip to 4,000 lbs./inch of nip, at a roll surface temperature of from 110° F. to 180° F. and at a roll peripheral surface speed of from 350 ft/min. to 800 ft/min., removing from said roll mill on a weight basis of the feed roast and ground coffee a yield of flaked coffee of over 80 percent to provide a flaked coffee product of high structural integrity which does not have a propensity towards changing bulk density after packing.

2. The process of claim 1 wherein the roast and ground coffee to be flaked is decaffeinated coffee.

3. The process of claim 1 wherein the roast and ground coffee to be flaked is further characterized by having a particle size of from 0.0 to 18.0 percent on 12 mesh, from 0.0 to 46.0 percent on 16 mesh, from 15.0 to 50.0 percent on 20 mesh, from 7.0 to 30.0 percent on 30 mesh, from 4.0 to 15.0 percent on 40 mesh and from 3.0 to 8.0 percent through a 40 mesh.

4. The process of claim 3 wherein the roast and ground coffee to be flaked is regular grind.

* * * * *